United States Patent
Plummer

[15] 3,635,050
[45] Jan. 18, 1972

[54] DRIVE TRANSMISSION WITH UNIVERSAL COUPLINGS

[72] Inventor: Alan C. Plummer, Rockford, Ill.
[73] Assignee: Woodward Governor Company, Rockford, Ill.
[22] Filed: Nov. 25, 1969
[21] Appl. No.: 879,658

[52] U.S. Cl................................................................64/13
[51] Int. Cl.............................................................F16d 3/78
[58] Field of Search............................64/13, 15 B, 12, 11

[56] References Cited

UNITED STATES PATENTS

| | | | |
|---|---|---|---|
| 2,386,017 | 10/1945 | Venditty | 64/11 |
| 1,422,339 | 7/1922 | Church | 64/13 |
| 2,630,692 | 3/1953 | Naugler | 64/15 B |

*Primary Examiner*—Benjamin W. Wyche
*Assistant Examiner*—Randall Heald
*Attorney*—Wolfe, Hubbard, Leydig, Voit & Osann

[57] ABSTRACT

A generator shaft is connected to the toothed wheel of a speed sensor by torsionally rigid but axially deflectable flat coupling plates which enable driving of the wheel in a precisely fixed plane while accommodating misalignment between the wheel and the shaft in all planes.

6 Claims, 8 Drawing Figures

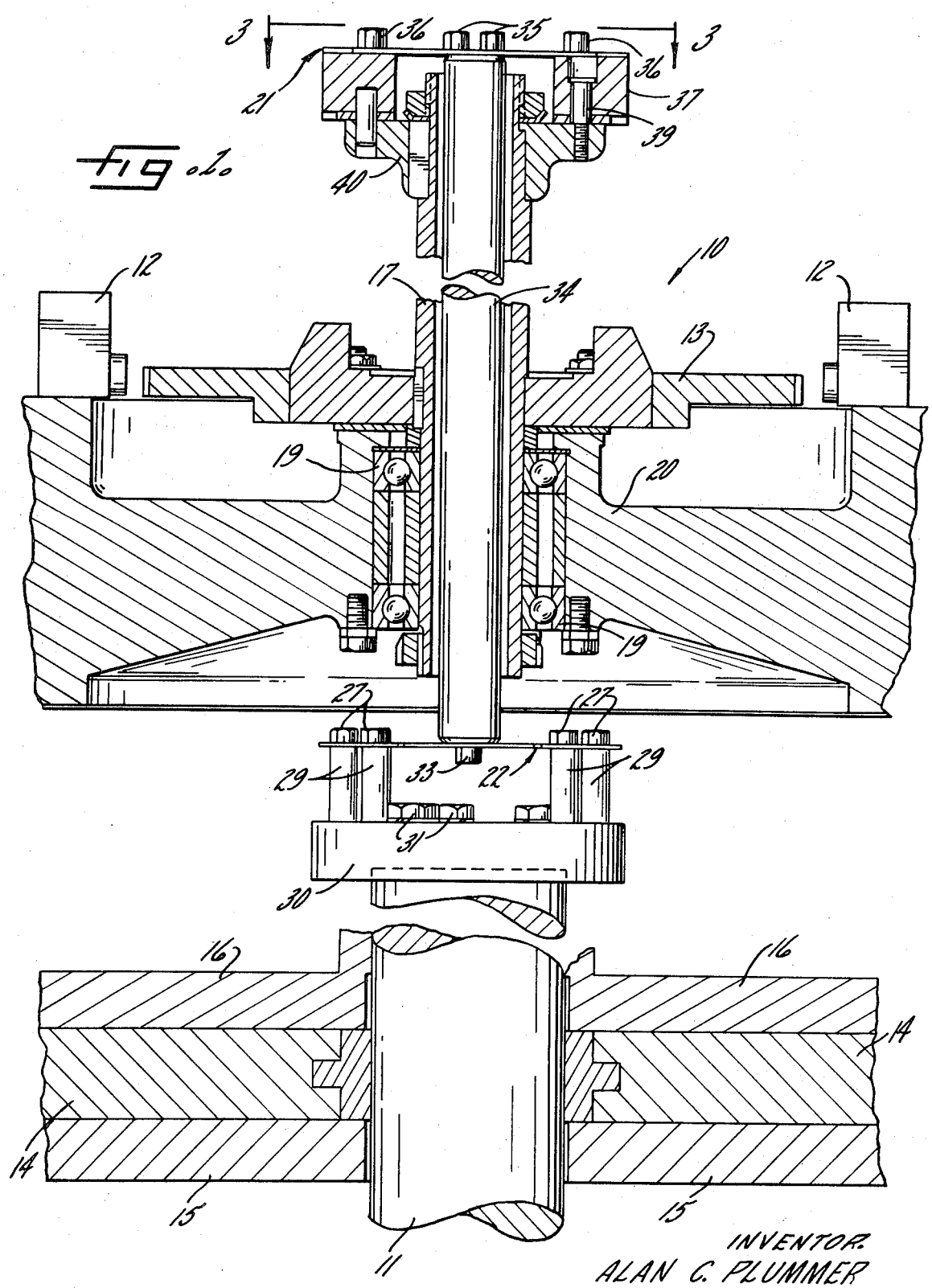

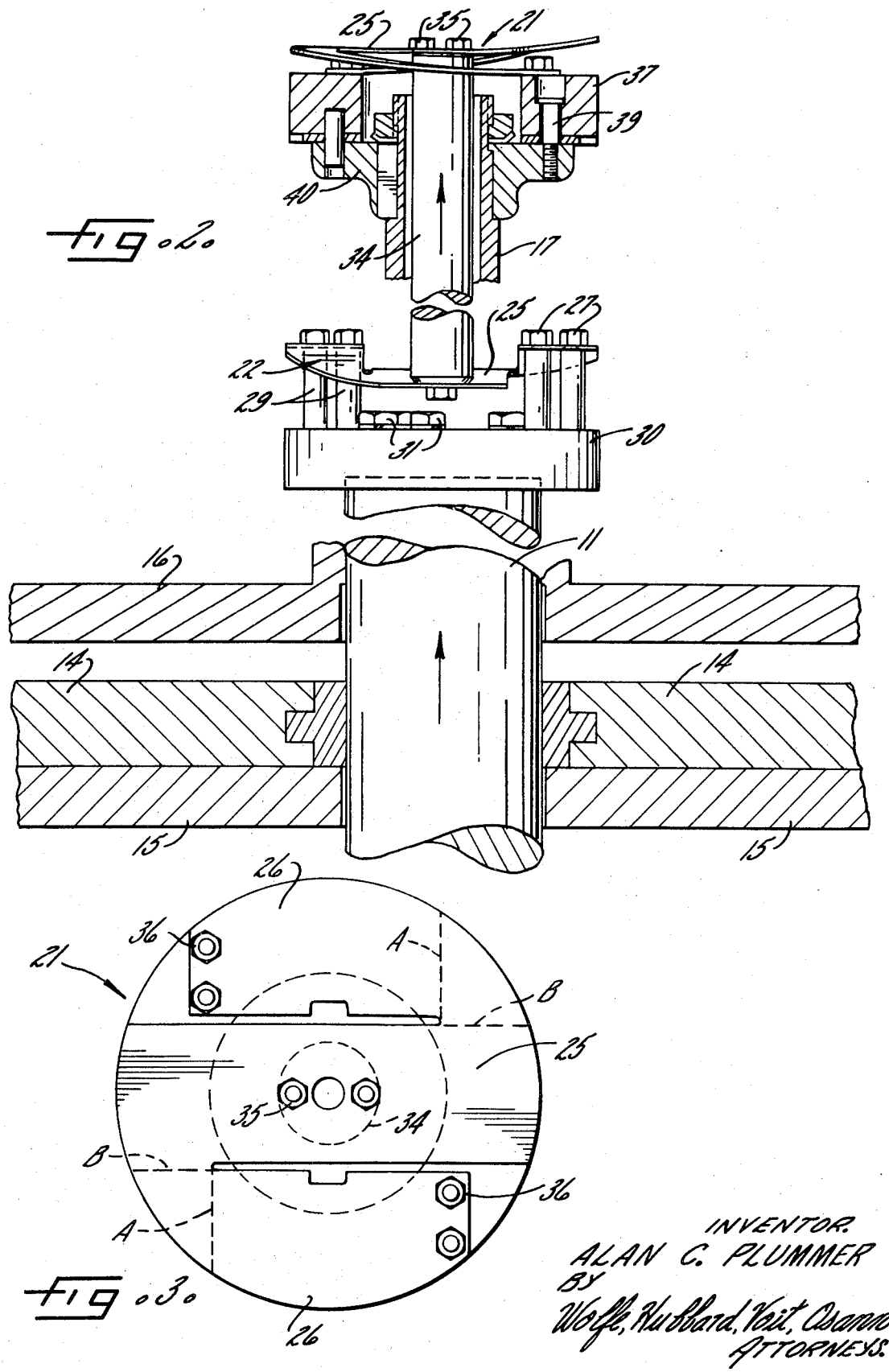

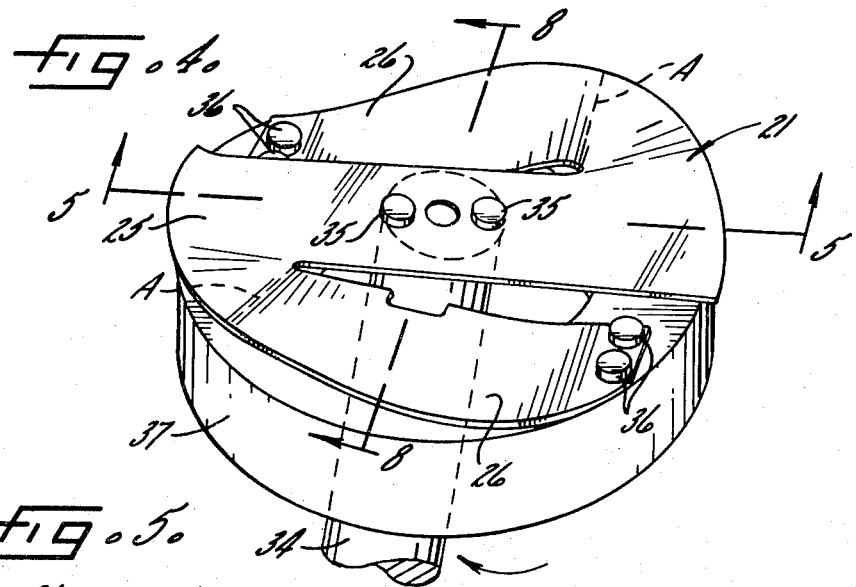
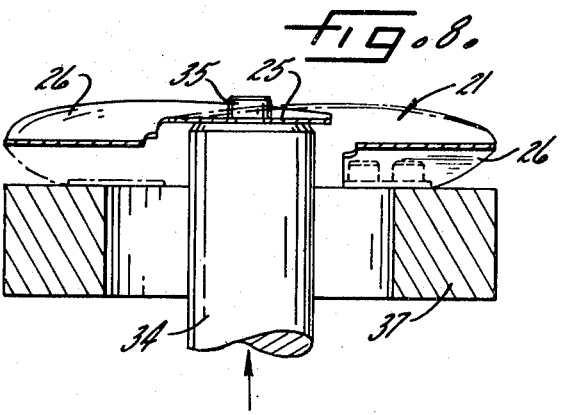
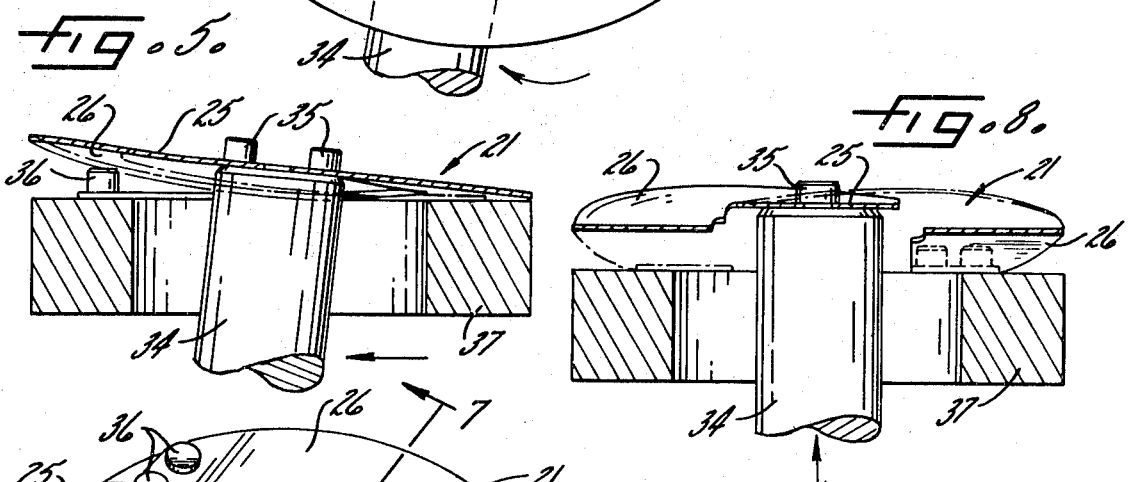
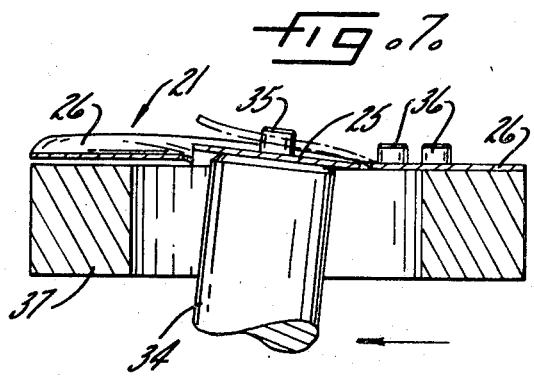
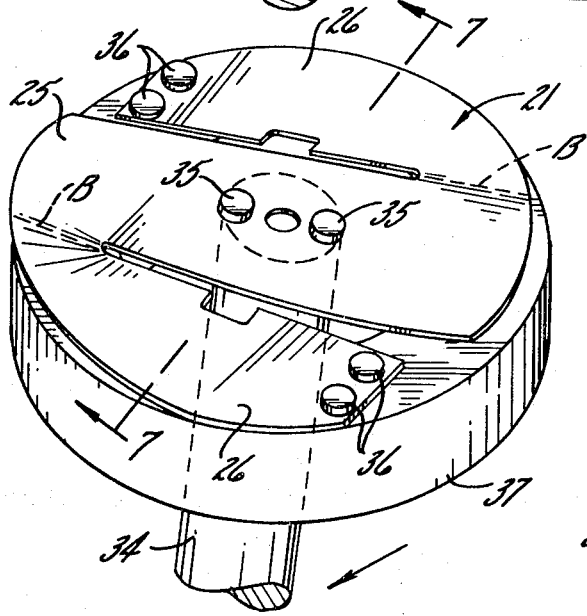
INVENTOR.
ALAN C. PLUMMER
BY
Wolfe, Hubbard, Voit & Osann
ATTORNEYS.

DRIVE TRANSMISSION WITH UNIVERSAL COUPLINGS

BACKGROUND OF THE INVENTION

This invention relates to a drive transmission and, more particularly, to a transmission having a pair of universal couplings connecting a power-driven shaft to the toothed wheel of a speed sensor in such a manner as to permit rotation of the wheel in a precisely fixed plane in spite of any gyration of the shaft and of any angular and parallel misalignment between the rotational axes of the shaft and the wheel.

SUMMARY OF THE INVENTION

The primary aim of the present invention is to provide a unique drive transmission of the above type having new and improved universal couplings which, when compared to previous couplings used for similar purposes, and not only simpler and less expensive in construction but which also experience less wear during service use so as to maintain for longer periods of time a torsionally stiff and torsionally nonoscillatory drive between the shaft and the wheel. More specifically, each coupling comprises a flat, torsionally rigid plate through which the driving torque is transmitted edgewise but which is capable of deflecting resiliently about axes extending transaxially of the shaft and the wheel to accommodate misalignment between the two in all planes. In addition, the coupling plates advantageously permit selective endwise shifting of the shaft relative to the wheel to enable easy replacement of radially insertable and removable thrust bearings which support the shaft.

The invention also resides in the novel configuration of the coupling plates to allow a plate of given size to deflect through a comparatively wide range without being overstressed; in the relative angular positioning of the two plates to better accommodate misalignment of the shaft and the wheel; and in the unique manner of driving the wheel from the power-driven shaft through a telescoped sleeve and intermediate shaft to enable a reduction in the axial spacing between the wheel and the shaft while keeping the bending stresses on the plates relatively low and also to facilitate use of the transmission with driving shafts having differently locate driving ends of various different types.

These and other objects and advantages of the invention will become more apparent from the following detailed description when taken in connection with the accompanying drawings.

BRIEF DESCRIPTION OF THE DRAWINGS

FIG. 1 is a cross section taken vertically through a new and improved drive transmission embodying the novel features of the present invention and showing the power-driven shaft supported by thrust bearings.

FIG. 2 is a fragmentary view similar to FIG. 1 but showing the shaft shifted axially with respect to the toothed wheel for purposes of replacing the thrust bearings.

FIG. 3 is a cross section taken substantially along the line 3—3 of FIG. 1 and showing one of the coupling plates.

FIG. 4 is a perspective view of one of the plates and showing, in a greatly exaggerated manner, the plate deflected to accommodate misalignment between the shaft and the toothed wheel in one plane.

FIG. 5 is a fragmentary cross section taken substantially along the line 5—5 of FIG. 4.

FIG. 6 is a view similar to FIG. 4 but showing the coupling plate deflected to accommodate misalignment between the shaft and the wheel in another plane.

FIG. 7 is a fragmentary cross section taken substantially along the line 7—7 of FIG. 6.

FIG. 8 is a fragmentary cross section taken substantially along the line 8—8 of FIG. 4 and showing the coupling plate deflected to accommodate endwise shifting of the shaft relative to the toothed wheel.

DETAILED DESCRIPTION OF THE PREFERRED EMBODIMENT

As shown in the drawings for purposes of illustration, the invention is incorporated in a drive transmission 10 for transmitting torque from a power-driven shaft 11 (FIG. 1), such as the shaft of an electric generator driven by a hydraulic turbine, to a toothed wheel 13 which coacts with a pair of magnetic pickup elements 12 to produce a repetitive pulsed output signal that is proportional in frequency to the speed of the shaft. The toothed wheel and the pickup elements are part of an electrical speed governor and constitute a speed sensor whose output signal is representative of the actual speed of the turbine-generator unit.

Herein, the generator shaft 11 is journaled for rotation in radial bearings (not shown) and also is supported by a set of thrust bearings formed by a number of sector-shaped shoes 14 (FIG. 1) sandwiched between a fixed support 15 on the generator and a flange 16 fast on the shaft. Each shoe extends around part of the circumference of the shaft and may be radially inserted into and removed from supporting relation with the shaft when the latter is shifted axially relative to the support 15 as shown in FIG. 2 to lift the flange 16 upwardly from the shoes.

The toothed wheel 13 is fast on a driven shaft which herein is in the form of an upright tubular sleeve 17 (FIG. 1) journaled for rotation in sets of axially spaced ball bearings 19 supported by a rigid frame member 20 located above the driving end of the generator shaft 11. The magnetic pickup elements 12 also are supported on the frame member and are spaced diametrically from one another around the periphery of the wheel in close proximity thereto. With the sleeve 17 supported rigidly by the bearings 19 and the frame member 20, the toothed wheel rotates at all times in a plane which is precisely fixed relative to the pickup elements so that the output signal therefrom will accurately represent the speed of the generator shaft 11. In this instance, the wheel is driven in a clockwise direction when viewed from its upper side.

Driving torque is transmitted from the generator shaft 11 to the toothed wheel 13 through upper and lower universal couplings 21 and 22 (FIGS. 1 and 2) which connect the shaft 11 to the sleeve 17. The universal couplings accommodate any parallel and angular misalignment that might exist between the generator shaft and the sleeve and also enable driving of the sleeve despite the tendency of the generator shaft to gyrate within its supporting bearings and relative to the rigidly supported sleeve, such gyration commonly being called "runout". Accordingly, the universal couplings permit the generator shaft to rotate the toothed wheel in a precisely fixed plane even though the axes of the shaft and the wheel do not exactly coincide.

In its primary aspect, the present invention contemplates the provision of a new and improved universal couplings 21 and 22 comprising flat plates which are resiliently flexible and fully capable of deflecting axially to the extent necessary to accommodate misalignment between the shaft 11 and the sleeve 17 but which, at the same time, are torsionally stiff and capable of transmitting the driving torque to the sleeve without any torsional oscillation occuring even after the plates have been subjected to extended service use. The plates 21 and 22, while being of extremely simple and inexpensive construction, experience little if any wear and establish between the shaft 11 and the toothed wheel 13 a drive which remains torsionally stiff for a longer period of time than has been possible heretofore.

In the present instance, the two coupling plates 21 and 22 are identical and each is stamped from a flat sheet of resiliently flexible material such as spring steel having a thickness of about one thirty-second of an inch. Each plate preferably is generally S-shaped (as viewed from its underside in FIGS. 1 to 3) and comprises an elongated and substantially rectangular center or intermediate section 25 (FIGS. 3 and 4)

located centrally of the plate. Cantilevered on opposite ends of the intermediate section are end sections or arms 26 which project in opposite directions from the ends of the intermediate section and lie along opposite side edges of such section. Each arm is capable of bending or deflecting relative to its intermediate section along an axis an indicated generally at A in FIG. 3 and also along a substantially perpendicular axis indicated generally at B. With the plates being generally S-shaped and with the arms 26 being cantilevered to the intermediate sections 25 in the manner illustrated, the arms may deflect through considerable distances without being overstressed.

As shown most clearly in FIG. 1, the free ends of the arms 26 of the lower coupling plate 22 are fastened by screws 27 to posts 29 upstanding from and diametrically spaced around a disc 30 which, in turn, is anchored to the driving end of the generator shaft 11 by angularly spaced screws 31. The intermediate section 25 of the lower plate is fastened by screws 33 to the lower end of an intermediate shaft 34 which advantageously extends upwardly through and is telescoped loosely within the sleeve 17. The intermediate section 25 of the upper coupling plate 21 is connected to the upper end of the intermediate shaft 34 by screws 35 and, as shown in FIGS. 1 and 4, the free ends of the arms 26 of such plate are fastened by screws 36 to a flat disc 37. Screws 39 connect the disc 37 to a collar 40 which is fast on the upper end portion of the sleeve 17. Thus, the drive from the generator shaft 11 to the toothed wheel 13 is established through the lower coupling plate 22, the intermediate shaft 34, the upper coupling plate 21 and the tubular sleeve 17.

With the foregoing arrangement, the arms 26 of the coupling plates 21 and 22 may deflect or bend relative to the intermediate sections 25, allowing tilting of the intermediate shaft 34 within the sleeve 17, to accommodate any angular or parallel misalignment between the generator shaft 11 and the sleeve 17 and also any gyration of the generator shaft. The resistance of the arms to bending about the axes A is less than their resistance to bending about the axes B and thus the arms of the upper coupling plate 21 preferably are disposed at right angles to the arm of the lower plate in order to more uniformly distribute the bending stresses between the two plates when the intermediate shaft 34 is tilted. Also, one of the plates, in this instance the lower plate, is positioned so as to appear as a true S when viewed from the top. The upper plate is flopped over and appears as a reverse S when viewed from the top. In this way, the clockwise driving torque places the plates in tension rather than compression. If the wheel were driven counterclockwise, the lower plate would be positioned to appear as a reverse S and the upper plate as a true S when viewing the plates from the top.

As an example of the deflection undertaken by the coupling plates 21 and 22 when the generator shaft 11 and the sleeve 17 are parallel but not concentric with one another, let it be assumed that the upper coupling plate is disposed in the angular position shown in FIG. 4 and that the shaft and the sleeve are misaligned in the plane of the drawing so that the intermediate shaft 34 must tilt in the same plane and as shown in FIG. 5 to accommodate the misalignment. Under such circumstances, the intermediate section 25 of the upper plate 21 flexes upwardly relative to the arms and deflects generally about the axes A (see FIGS. 4 and 5) such that the right end of the intermediate section bears downwardly against the upper face of the disc 37 while the left end of the intermediate section raises slightly upwardly from the disc. At the same time, the intermediate section 25 of the lower plate 22 may deflect slightly relative to the arms 26 of such plate about the axes B since the arms of the lower plate are disposed at right angles to the arms of the upper plate.

Now, if the generator shaft 11 and the sleeve 17 are misaligned in a plane normal to the drawing, causing tilting of the intermediate shaft 34 as shown in FIGS. 6 and 7, the intermediate section 25 of the upper plate 21, when angularly disposed as shown in FIG. 6, deflects relative to the arms 25 generally about the axes B to accommodate the tilting of the shaft 34 without changing the position of the disc 37 and the sleeve 17. The intermediate section 25 of the lower plate 22 may, at the same time, deflect slightly relative to the arms 26 about the axes A. Thus, the plates accommodate parallel misalignment of the shaft 11 and the sleeve 17, regardless of the plane of misalignment with the intermediate section of each plate flexing relative to the arms generally about the axes A and then about the axes B as the shaft rotates.

In substantially the same way, the coupling plates 21 and 22 flex to accommodate angular misalignment between the generator shaft 11 and the sleeve 17, that is to say, misalignment which results if the generator shaft and the sleeve are not parallel but are tilted at an angle relative to one another. The intermediate sections 25 of the plates also deflect relative to the arms 26 if the generator shaft gyrates relative to the sleeve and allow driving of the latter about a precisely fixed axis regardless of such gyration. It should be understood that the intermediate sections 25 do not at all times deflect precisely about the axes A and B as the shaft 11 rotates. The intermediate section of each plate is, however, capable of deflecting about mutually perpendicular axes lying generally in the plane of the plate and extending transaxially of the shaft and the sleeve substantially along the lines A and B thereby to accommodate misalignment of the shaft and the sleeve in all planes. Because each plate is flat and torsionally rigid and because the driving torque is transmitted edgewise through the plates, the drive from the generator shaft 11 to the toothed wheel 13 is torsionally stiff and torsionally nonoscillatory and remains so during continued service use.

By taking the drive from the generator shaft 11 to the toothed wheel 13 first upwardly through the intermediate shaft 34 and then back downwardly through the telescoped sleeve 17, the vertical spacing between the two coupling plates 21 and 22 is made large so that the intermediate shaft need only tilt slightly and stress the plates to a small degree when misalignment is present and, at the same time, the vertical spacing between the toothed wheel and the driving end of the generator shaft is kept small. By simply using an intermediate shaft 34 of a different length, the same transmission 10 may be mounted in exactly the vertical same position but used with a generator shaft 11 whose driving end is spaced closer to or farther from the toothed wheel or is equipped with a different type of connecting disc 30.

To advantage, the coupling plates 21 and 22 enable endwise shifting of the generator shaft 11 relative to the sleeve 17 when the bearing shoes 14 need replacing. That is, when the shoes become worn, the shaft 11 may be shifted upwardly, as shown in FIG. 2, with the arms 26 of the plates deflecting relative to the intermediate sections 25 to permit such shifting. In deflecting, the arms of each plate flex generally about the axes A as shown in FIG. 8. With the flange 16 lifted upwardly from the shoes 14, the latter may be slid radially off of the support 15 and replaced with a new set of shoes. Because two plates are employed the shaft 11 may be shifted endwise a distance equal to twice the distance that each individual arm may deflect relative to its intermediate section without being overstressed.

In an actual installation, the intermediate shaft 34 is made somewhat shorter than shown in FIG. 1 so that the arms 26 of the coupling plates 21 and 22 are initially deflected relative to the center sections 25 when the generator shaft 11 is in its normal position with the flange 16 resting on the shoes 14. As a result, when the shaft 11 is shifted endwise, each arm may flex relative to its intermediate section, first to an undeflected position and then past such position to a position in which the arms are deflected reversely of their original deflection. This allows greater endwise displacement of the generator shaft without overstressing the coupling plates.

I claim as my invention:

1. In a speed sensor drive, the combination of, a power-driven shaft, a second shaft spaced axially from the first shaft and extending generally along the axis of said first shaft, a speed sensor including a toothed wheel fixed to said second shaft, a bearing journaling and supporting said wheel for rotation in a precisely fixed plane spaced axially from the end of said first shaft, an intermediate shaft extending generally along the axes of said first and second shafts, a torsionally rigid coupling plate having a center section fixed to one of the adjacent ends of said first and intermediate shafts, said coupling plate having oppositely extending arm sections integral with said center section and fixed at their free ends to the end of the other of the first and intermediate shafts, a second and similar plate coupling the adjacent ends of said second and intermediate shafts with the center section thereof fixed to one of such shafts and with the arm sections secured to the other of such shafts, the corresponding arm sections of said first and second plates extending substantially at right angles to each other, and each of said coupling plates being substantially flat whereby the driving torque is transmitted edgewise through the plates, and each plate, by bending along axes extending transaxially of said shafts, accommodating relative misalignment of the coupled shafts in all planes.

2. A speed sensor drive as defined in claim 1 in which said second shaft is a sleeve substantially concentric with and surrounding said intermediate shaft.

3. A speed sensor drive as defined in claim 1 in which each of said coupling plates is generally S-shaped.

4. A speed sensor drive as defined in claim 1 in which the arm sections of each plate project in opposite directions from opposite ends of the center section.

5. In a drive transmission, the combination of, driving, intermediate and driven shafts rotatable generally about the same axis, first and second substantially flat and torsionally rigid coupling plates made of resiliently yieldable material extending transaxially of and transmitting torque between the shafts, each of said plates being generally S-shaped and being formed with an intermediate section and with arms lying alongside opposite side edges of the intermediate section and projecting in opposite directions from opposite ends of the intermediate section, the arms of said first coupling plate being connected to one of the adjacent ends of said driving and intermediate shafts and the intermediate section of such plate being connected to the other of such ends, the arms of said second coupling plate being connected to one of the adjacent ends of said intermediate and driven shafts and the intermediate section of such plate being connected to the other of the latter ends, and each arm of each plate being resiliently cantilevered on its respective intermediate section for deflection relative to the latter about two substantially perpendicular axes extending transaxially of the shafts to accommodate misalignment between the shafts in all planes and to enable endwise shifting of said shafts relative to one another.

6. In a speed sensor drive, the combination of, a power-driven shaft, a thrust bearing supporting said shaft and insertable into and removable from supporting relation with the shaft radially of the latter, a driven sleeve spaced axially from the first shaft and extending generally along the axis of the first shaft, a speed sensor including a toothed wheel fixed to said sleeve, a bearing journaling said sleeve and supporting said wheel for rotation in a precisely fixed plane spaced axially from the end of said first shaft, an intermediate shaft telescoped into said sleeve, first and second torsionally rigid coupling plates of resiliently yieldable material for transmitting torque from said first shaft to said intermediate shaft said sleeve, each of said coupling plates having an intermediate section and having arms lying alongside opposite side edges of the intermediate sections and projecting in opposite directions from opposite ends of the intermediate section, the arms of said first coupling plate being connected to one of the adjacent ends of said first coupling plate being connected to one of the adjacent ends of said first and intermediate shafts and the intermediate section of such plate being connected to the other of such ends, the arms of said second coupling plate being connected to one of the adjacent ends of said intermediate shaft and said sleeve and the intermediate section of such plate being connected to the other of the latter ends, and each arm of each plate being resiliently cantilevered on its respective intermediate section for deflection relative to the latter about two substantially perpendicular axes extending transaxially of the shafts to accommodate misalignment between the two shafts and the sleeve in all planes and to enable endwise shifting of said shafts relative to said sleeve for purposes of inserting and removing said thrust bearing.

* * * * *